Aug. 20, 1957 W. K. HOPE 2,803,408
WATER TEMPERATURE CONTROL VALVE
Filed July 18, 1955
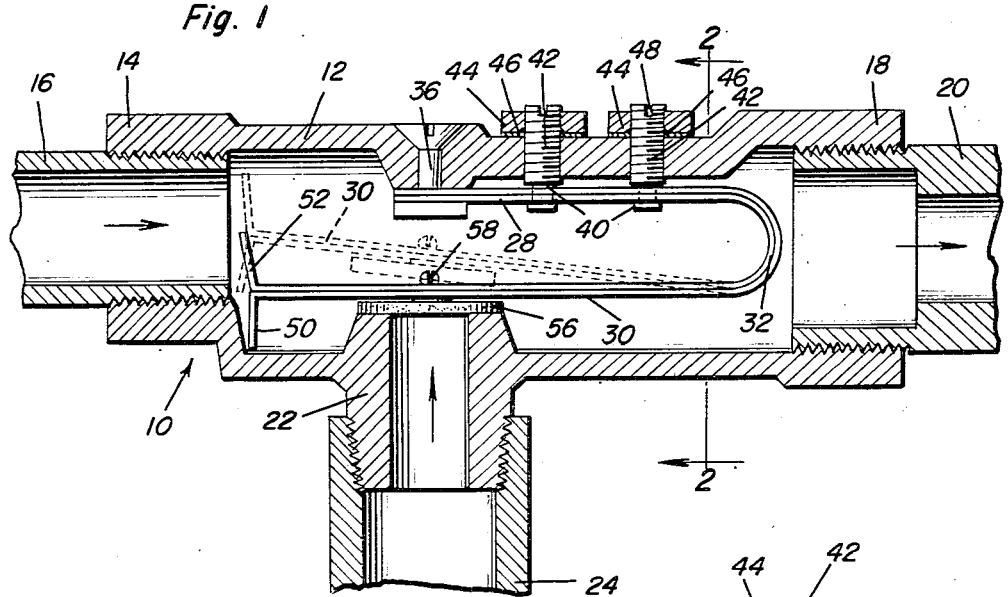
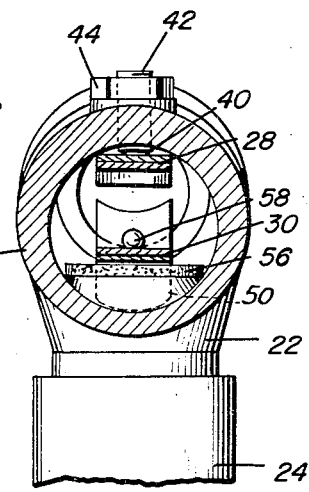
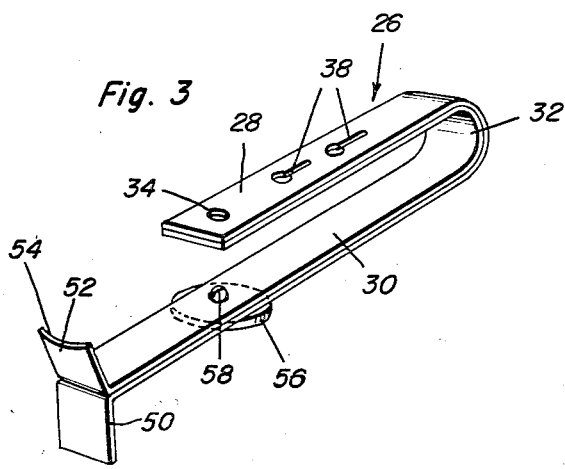
William K. Hope
INVENTOR.

United States Patent Office 2,803,408
Patented Aug. 20, 1957

2,803,408

WATER TEMPERATURE CONTROL VALVE

William K. Hope, Chesham, N. H.

Application July 18, 1955, Serial No. 522,721

3 Claims. (Cl. 236—12)

This invention generally relates to new and improved construction in temperature control valves and more specifically provides a water temperature control valve for mixing hot and cold water for supplying warm water under normal household pressure to a shower or other outlets at a substantially constant temperature.

An object of the present invention is to provide a water temperature control valve for maintaining the discharge of the water at a predetermined temperature to permit the water to be discharged from a suitable faucet, shower head or the like without constantly adjusting the flow of hot and cold water.

In carrying out the present invention, a control valve is provided having a generally tubular or hollow housing having a cold water and hot water inlet together with a mixed or warm water discharge. Positioned within the housing is a bi-metallic thermal element having means thereon for partially obstructing the in-flow of water through the hot and cold water inlets in response to the flow of the mixed water through the discharge whereby the discharged water will be retained at a constant temperature within a certain differential.

Other objects of the present invention will reside in the simplicity of construction, ease of adjustment, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal, vertical sectional view taken substantially upon a plane passing through the longitudinal center of the control valve of the present invention illustrating the details of construction thereof;

Figure 2 is a transverse, vertical sectional view taken substantially upon the plane passing along section line 2—2 of Figure 1 illustrating the internal structure of the valve; and Figure 3 is a perspective view of the bi-metallic element with the obstructions positioned thereon.

With reference to the official drawings, the numeral 10 generally designates the control valve of the present invention including a generally elongated tubular hollow housing 12 having a fitting 14 at one end thereof for screw-threadedly receiving a cold water pipe 16. In longitudinal alignment therewith and at the other end of the housing 12 is a fitting 18 for receiving a discharge pipe 20 for the mixed or warm water which may be connected to a shower head or any other suitable discharge requiring a constant temperature water.

In perpendicular relation to the longitudinal axis of the housing 12 is disposed a fitting 22 for connection to a hot water pipe 24 wherein the fittings 22 and 14 form hot and cold water inlets respectively and the hollow housing 12 forms a mixing chamber for mixing the water for discharge through the fitting 18.

Disposed within the housing 12 is a bi-metallic thermal element generally designated by the numeral 26 which includes a short leg 28 and a long leg 30 interconnected by a bight portion 32. The free end of the short leg 28 of the thermal element 26 is provided with an aperture 34 for receiving a fastening bolt 36 for rigidly securing the free end of the bi-metallic thermal element 26 to the housing 12. In spaced relation to the aperture 34 is a pair of spaced keyhole slots 38 for receiving the reduced headed end 40 for adjusting screws 42 which are provided with lock nuts 44 on the outer ends thereof. The adjusting screws 42 extend through the wall of the housing 12 and are provided with packing washers 46 between the nut 44 and the housing 12 and the outer end of the screws 42 are provided with slots 48 for receiving a suitable tool, such as a screwdriver or the like for turning the screws 42 for rigidifying and adjusting the short leg 28 thereby varying the characteristics of movement of the long leg 30 of the thermal element 26.

The outer end or free end of the long leg 30 is provided with a downturned portion 50 and an upturned portion 52 wherein the upturned portion 52 is provided with a concave upper edge 54 for disposition in front of the discharge end of the cold water inlet pipe 16. Mounted on the long leg 30 in spaced relation to the free end thereof is a valve disk 56 swivelly mounted thereon by a headed fastener 58 for selective engagement with the inner end of the adapter 22 for controlling the flow of water from the hot water inlet pipe 24.

Movement of the long leg 30 is in response to the variation in expansion and contraction of the bi-metallic thermal element 32 and especially the bight portion thereof which is disposed adjacent the discharge of the mixed water. Movement of the long leg will effectively control the inlet of water through the inlets 14 and 22 for retaining the discharged water at a substantially constant temperature and by varying the screws 42, the temperature of the discharged water may be controlled thereby eliminating the necessary manual adjustment of manual valves for retaining the discharge water at a constant temperature.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalent may be resorted to, falling within the scope of the invention as claimed.

What is claimed as new is as follows:

1. A valve for mixing hot and cold water for discharge at a substantially constant temperature comprising an elongated hollow housing having a discharge opening, a cold water inlet, and hot water inlet, said inlets being disposed in perpendicular adjacent relation, a generally U-shaped bi-metallic thermal element having one leg longer than the other, means for mounting the short leg of the thermal element on said housing, a transverse member on the free end of the long leg of said thermal element for selectively obstructing the flow of water through one of said inlets, and means on said long leg in spaced relation to the transverse member for selectively obstructing the flow of water through said other inlet, said thermal element having the bight portion adjacent the discharge opening for moving the free end of the long leg thereby obstructing the flow of water through the inlets in response to the temperature of the water passing through the discharge for maintaining a substantially constant discharge water temperature, the free end of said short leg of said thermal element being rigidly attached to the housing, and means adjustably interconnecting the housing and the short leg in spaced relation to the free end thereof for rigidifying the short leg thereby adjusting the movement of the obstructing means for varying the temperature of the discharge water.

2. A mixing valve for providing a supply of water at substantially a constant temperature, said valve comprising a generally elongated tubular housing having an opening at one end thereof for discharging mixed water therefrom, the other end of said housing having a cold water inlet opening in longitudinal alignment with the discharge opening, said housing having a hot water inlet opening extending in perpendicular relation to the cold water inlet and in adjacent relation thereto, said hot water inlet opening being defined by a cylindrical fitting terminating at its inner end in a valve seat, a U-shaped bimetallic element mounted in said housing, said element having a short leg, a bight portion, and a long leg extending generally parallel to the short leg, the free end of the short leg being secured to the housing in diametrically opposed relation to the hot water inlet opening whereby a portion of long leg overlies the valve seat on the cylindrical fitting, the bight portion of said element being disposed adjacent the discharge opening whereby the long leg will be caused to move in response to temperature variations in the water passing through the discharge opening, adjustment screw means extending through the wall of the housing, the inner end of said screw means being connected to the short leg in spaced relation to the free end of the short leg, lock means for securing the screw means in adjusted position for varying the normal position of the long leg for varying the discharge temperature, a valve disk mounted on said long leg for association with the valve seat for controlling the flow of hot water into the housing, a transverse obstruction member mounted on the free end of said long leg in close longitudinally spaced relation to the cold water inlet opening for movement into alignment with the cold water inlet opening and retarding the flow of cold water into the housing, said valve disk and transverse member being simultaneously movable with the long leg for increasing the flow of hot water and reducing the flow of cold water when the bight portion of the element is cooled by cool discharge water and for simultaneously decreasing the flow of hot water and increasing the flow of cold water by hot discharge water whereby the temperature of the discharge water may be maintained within a predetermined differential.

3. A valve for mixing hot and cold water for discharge at a substantially constant temperature comprising an elongated hollow housing having a discharge opening, a cold water inlet, and hot water inlet, said inlets being disposed in perpendicular adjacent relation, a generally U-shaped bi-metallic thermal element having one leg longer than the other, means for mounting the short leg of the thermal element on said housing, a transverse member on the free end of the long leg of said thermal element for selectively obstructing the flow of water through one of said inlets, and means on said long leg in spaced relation to the transverse member for selectively obstructing the flow of water through said other inlet, said thermal element having the bight portion adjacent the discharge opening for moving the free end of the long leg thereby obstructing the flow of water through the inlets in response to the temperature of the water passing through the discharge for maintaining a substantially constant discharge water temperature, the free end of said short leg of said thermal element being rigidly attached to the housing, and means adjustably interconnecting the housing and the short leg in spaced relation to the free end thereof for rigidifying the short leg thereby adjusting the movement of the obstructing means for varying the temperature of the discharge water, said obstructing means on the long leg including a valve member adapted to selectively close said other inlet, said transverse member including an upwardly and downwardly extending portion on the free end of said thermal element disposed in closely spaced relation to said one inlet for selectively obstructing the flow of water therethrough.

References Cited in the file of this patent

UNITED STATES PATENTS

| | | |
|---|---|---|
| 897,285 | Greenaway | Sept. 1, 1908 |
| 1,455,021 | Collin | May 15, 1923 |
| 1,996,330 | Goshaw | Apr. 2, 1935 |
| 2,581,045 | Rhoads | Jan. 1, 1952 |